UNITED STATES PATENT OFFICE.

AUGUST LEOPOLD LASKA, OF OFFENBACH-ON-THE-MAIN, GERMANY, ASSIGNOR TO CORPORATION OF CHEMISCHE FABRIK GRIESHEIM-ELEKTRON, OF FRANKFORT-ON-THE-MAIN, GERMANY.

DISAZO DYESTUFF.

982,509.     Specification of Letters Patent.     Patented Jan. 24, 1911.

No Drawing.     Application filed July 15, 1910. Serial No. 572,099.

*To all whom it may concern:*

Be it known that I, AUGUST LEOPOLD LASKA, doctor of philosophy, chemist, a subject of the German Emperor, and resident of Offenbach-on-the-Main, in the Grand Duchy of Hesse, Germany, with the post-office address Gerberstrasse 5, have invented new and useful Improvements in Disazo Dyestuff, of which the following is a specification.

My invention relates to the production of a red disazo dyestuff consisting in combining the tetrazo compound of dichlorodinitrobenzidin probably having the following constitution:

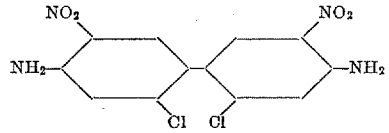

which can be obtained by nitration of the diacetyl compound of meta-meta′-dichlorobenzidin ($NH_2:Cl=1:3$) with nitric acid corresponding to two molecules and by splitting off the acidyl groups from the reaction product, with two molecules of $\beta$-naphthol. The dyestuff is insoluble in water and advantageously used in pasty form; it is soluble in concentrated sulfuric acid with blue-red color. The dyestuff is completely insoluble in oil and can be used for the preparation of red pigment colors.

*Example I. Preparation of the dichlorodinitrobenzidin.*—Meta-meta′-dichlorobenzidin is transformed in the usual manner into the diacetyl compound; 16.8 parts of the meta-meta′-dichlorodiacetylbenzidin well cooled with ice are dissolved in 100 parts of sulfuric acid 66° Bé. and at a temperature of 0–5° C. and the nitric acid corresponding to two molecular proportions gradually is added. Then the mixture is heated to 20° C. and the reaction product is poured into ice water. The precipitated dichlorodinitrodiacetylbenzidin is filtered off and the acidyl-groups are split off by heating with sulfuric acid having a strength of 25 per cent. The dichlorodinitrobenzidin forms a yellow powder and has a melting point of about 255 degrees centigrade.

*Example II. Preparation of the dyestuff.*—34.3 parts of dichlorodinitrobenzidin are sufficiently ground with 200 parts of water and 80 parts of hydrochloric acid 20° Baumé and diazotized with 14 parts of sodium nitrite. The resulting solution, which if necessary may be filtered, is introduced in 29 parts of $\beta$-naphthol, which is precipitated from a solution of the corresponding quantity of the sodium salt of $\beta$-naphthol in 500 parts of water in presence of Turkey red oil, and to which is added 140 parts of sodium acetate. The combination is quickly completed and the dyestuff is precipitated in form of red flakes. It is filtered off, washed with water and advantageously used in pasty form. The dyestuff is insoluble in water and soluble in concentrated sulfuric acid with a blue-red color.

Instead of the Turkey red oil can be used other similar acting ingredients, for instance soap or resin-lime or the combination can be made in absence of one of these ingredients. The combination of the tetrazo compound with $\beta$-naphthol can be made in presence of a substratum.

Now what I claim and desire to secure by Letters Patent is the following:

1. The process for the production of a disazo dyestuff consisting in combining the tetrazo compound of the dichlorodinitrobenzidin probably having the following constitution:

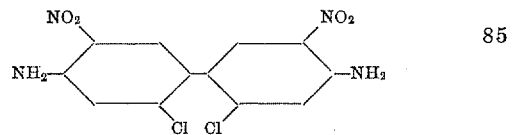

which can be obtained by nitration of the meta-meta′-dichlorodiacetylbenzidin and by splitting off the acidyl group of the reaction product, with two molecular proportions of $\beta$-naphthol.

2. As a new article the dyestuff obtained by combination of dichlorodinitrobenzidin probably having the following constitution:

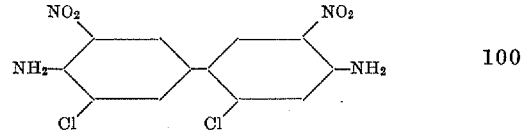

which can be obtained by nitration of the meta-meta′-dichlorodiacetylbenzidin and by splitting off the acidyl group of the reaction product with two molecular proportions of $\beta$-naphthol, which dyestuff forms in dry state a dark-red powder, insoluble in water, soluble in concentrated sulfuric acid with blue-red color and completely insoluble in oil and which can well be used for the preparation of pigment colors.

In testimony, that I claim the foregoing as my invention, I have signed my name in presence of two witnesses, this 5th day of July 1910.

AUGUST LEOPOLD LASKA.

Witnesses:
 EVA SATTLER,
 HERMANN WEST.